T. BRINING.
MACHINE FOR LASTING BOOTS OR SHOES.

No. 412,235. Patented Oct. 8, 1889.

Fig. 1.

(No Model.) 9 Sheets—Sheet 4.

T. BRINING.
MACHINE FOR LASTING BOOTS OR SHOES.

No. 412,235. Patented Oct. 8, 1889.

(No Model.) 9 Sheets—Sheet 5.

T. BRINING.
MACHINE FOR LASTING BOOTS OR SHOES.

No. 412,235. Patented Oct. 8, 1889.

(No Model.) 9 Sheets—Sheet 6.

T. BRINING.
MACHINE FOR LASTING BOOTS OR SHOES.

No. 412,235. Patented Oct. 8, 1889.

Fig. 6

(No Model.) 9 Sheets—Sheet 7.

T. BRINING.
MACHINE FOR LASTING BOOTS OR SHOES.

No. 412,235. Patented Oct. 8, 1889.

(No Model.) 9 Sheets—Sheet 9.

T. BRINING.
MACHINE FOR LASTING BOOTS OR SHOES.

No. 412,235. Patented Oct. 8, 1889.

UNITED STATES PATENT OFFICE.

THOMAS BRINING, OF LEEDS, COUNTY OF YORK, ASSIGNOR OF ONE-HALF TO GEORGE LISTER, OF HEADINGLY, LEEDS, ENGLAND.

MACHINE FOR LASTING BOOTS OR SHOES.

SPECIFICATION forming part of Letters Patent No. 412,235, dated October 8, 1889.

Application filed December 26, 1888. Serial No. 294,606. (No model.) Patented in England October 4, 1887, No. 13,391; in France July 24, 1888, No. 191,995, and in Belgium July 27, 1888, No. 82,702.

*To all whom it may concern:*

Be it known that I, THOMAS BRINING, a subject of the Queen of Great Britain and Ireland, residing at Leeds, in the county of York, England, have invented new and useful Improvements in Machines for Lasting Boots or Shoes, (for parts of which I have obtained Letters Patent in Great Britain and Ireland the 4th day of October, 1887, No. 13,391; in France the 24th day of July, 1888, No. 191,995, and in Belgium the 27th day of July, 1888, No. 82,702,) of which the following is a specification.

This invention relates to improvements in lasting-machines, such as are used in the boot and shoe trade for closing the "upper" over the insole; and the objects of these improvements are, first, to provide means whereby the boot or shoe upper may be held in position in a hollow mold (shaped to the outer contour of the boot or shoe) while an ordinary iron last is being forced down into the mold until the instep and outer portions of the upper are made to fit or blocked to the contour of the mold and last; second, to provide adjustable means for operating the wiper-plates on any required size of mold for closing the edges of the upper over the insole. I attain these objects by mechanism illustrated in the accompanying drawings, in which—

Like parts are marked in all the views with the same letters of reference.

The table A, its legs or uprights $a\, a$, longitudinal stretchers B B', transverse bearer C, and adjustable brackets D D' $D^2$ $D^3$ constitute the frame-work of the machine. In suitable bearings $a'\, a'$ on the legs or uprights $a\, a$ is mounted longitudinally a horizontal shaft E, on which are fixed the cam-plates $e\, e'\, e^2$ and bevel-wheel $e^3$, into which gears a pinion $e^4$, carried on the end of a short shaft $e^5$, mounted in horizontal bearings $e^6$ at a right angle to shaft E. On the outer end of shaft $e^5$ is fixed the hand-wheel F, provided with any desired number of ratchet-teeth $f$ (preferably ten or twelve) on its periphery and a set-screw $f'$, both for the purposes hereinafter set forth.

Figure 1:
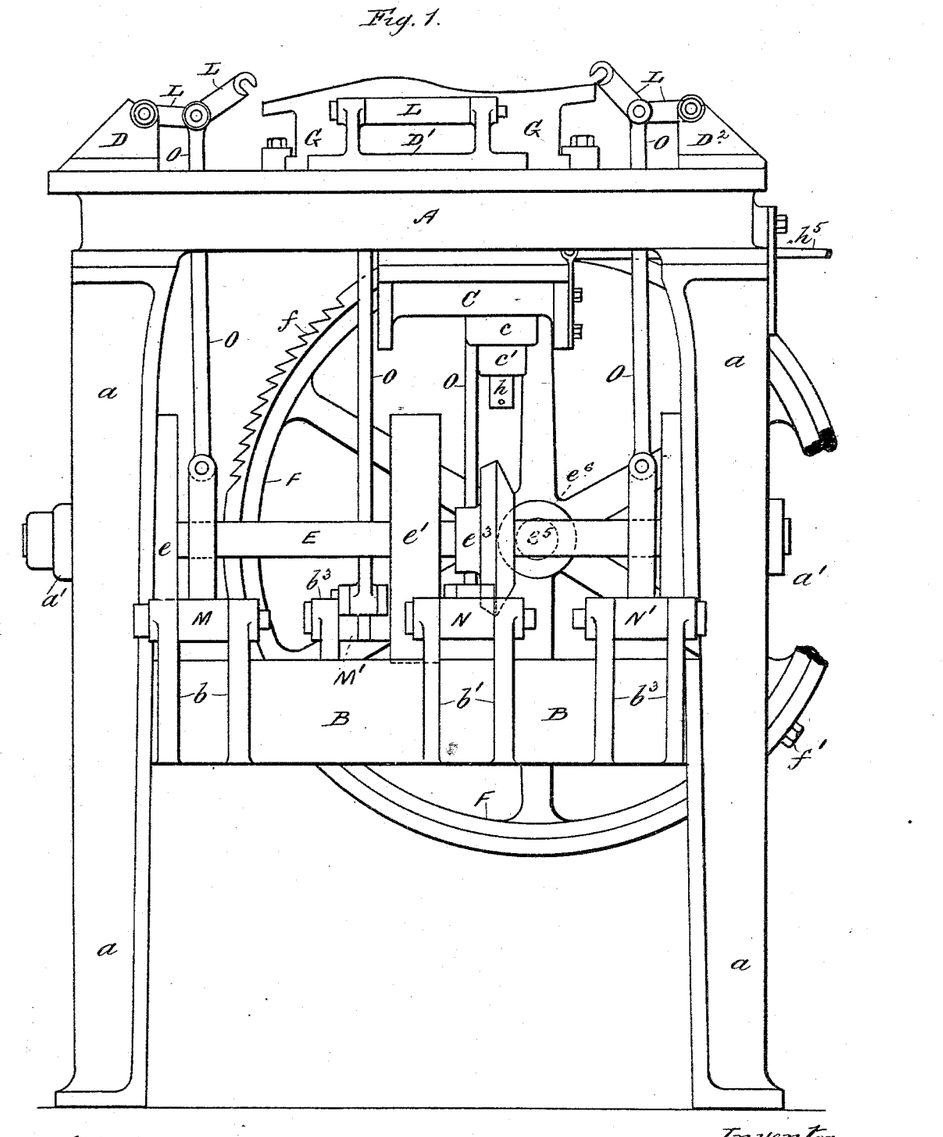
Figure 1 is a part side elevation of the machine.
Figures 2, 15:
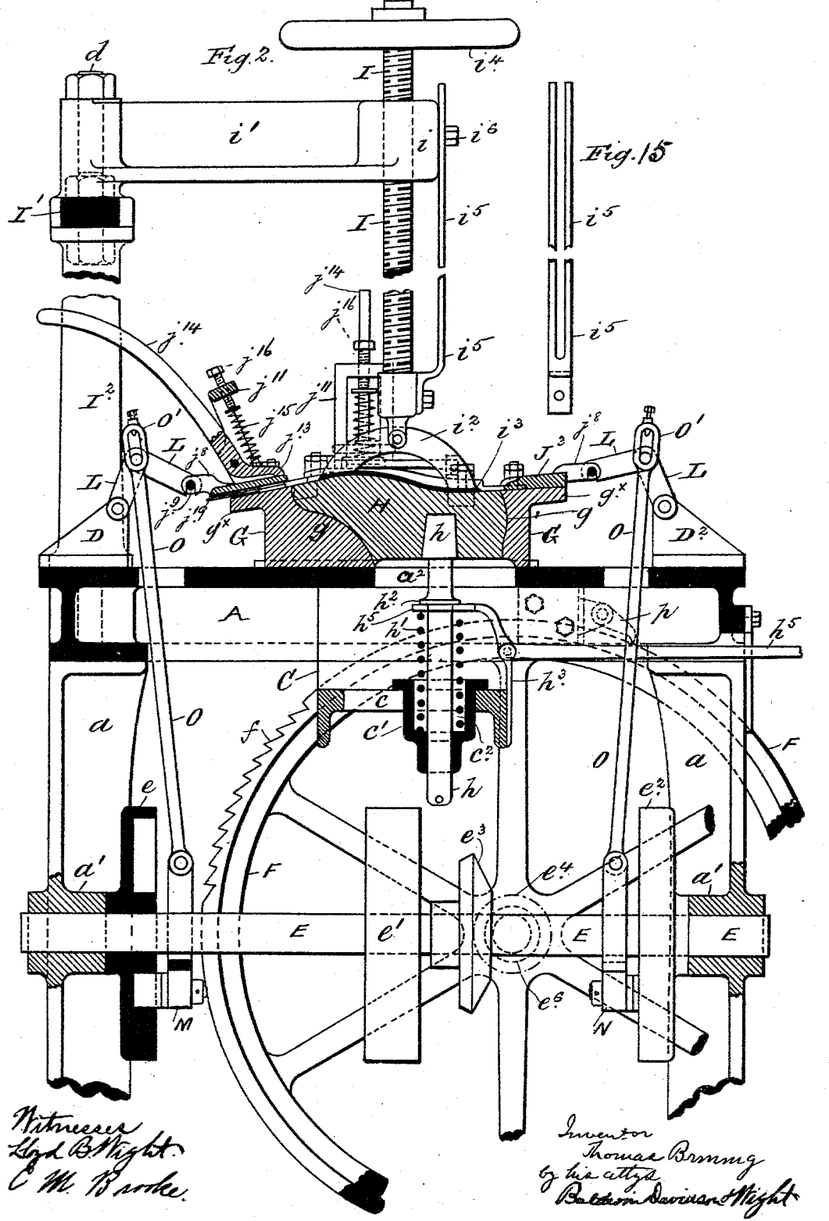
Fig. 2, a sectional elevation on line $xx$, Fig. 5.
Figs. 14 and 15 are details.
Figure 3:
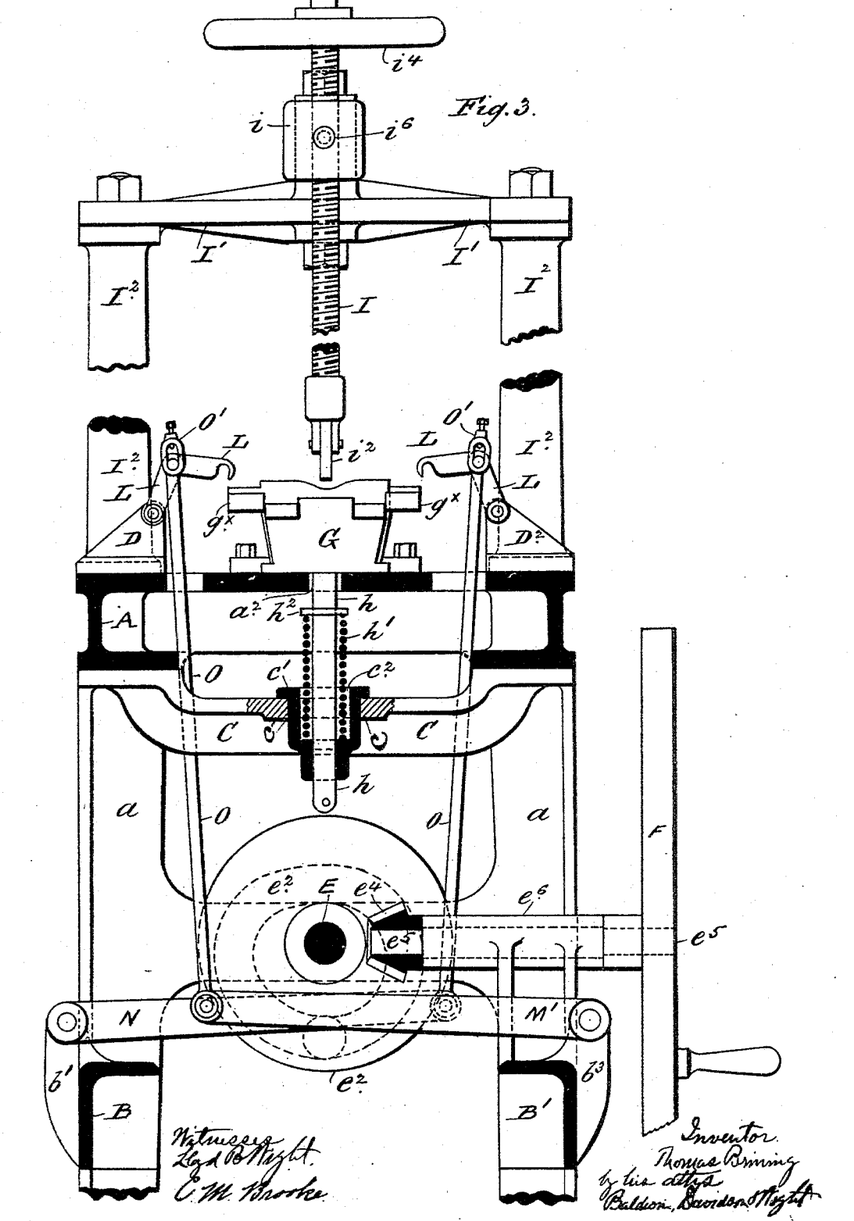
Fig. 3, a transverse section on line $ww$, Fig. 5.
Figure 4:
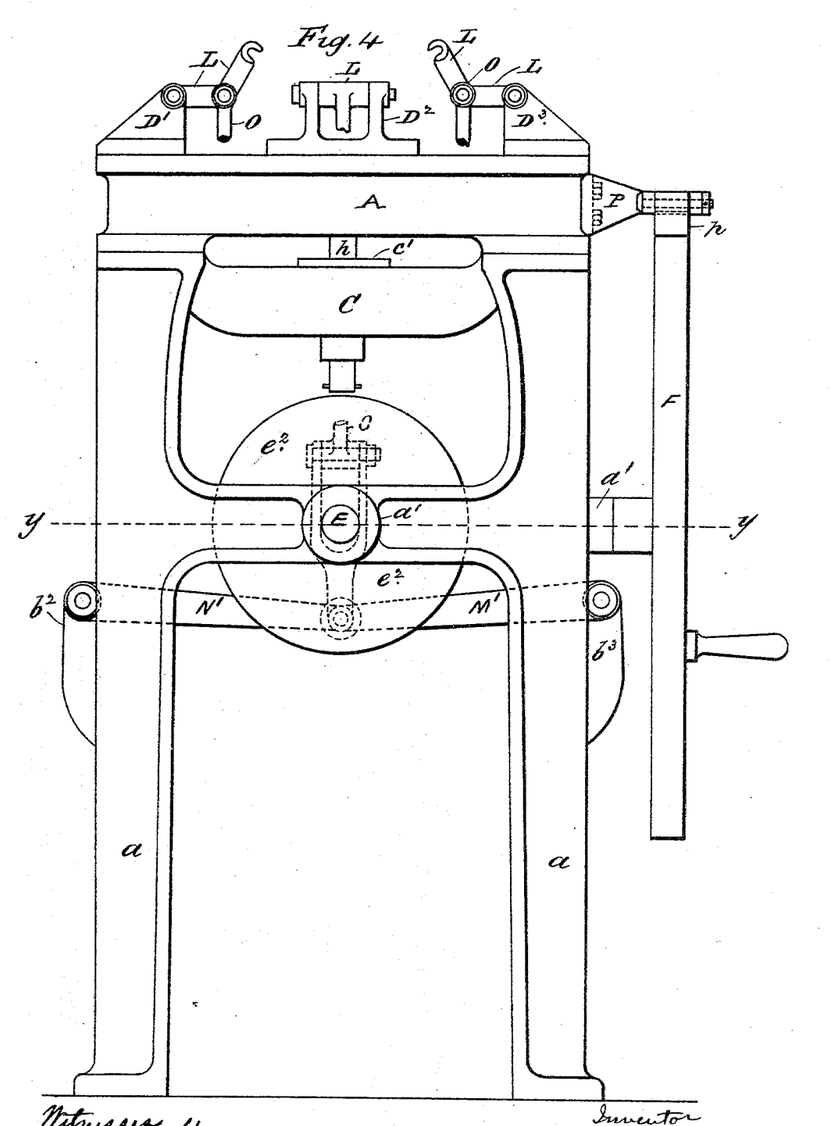
Fig. 4, a part end elevation.

G is the hollow mold, which may be mounted in any suitable manner longitudinally upon the table A, as shown at Figs. 1, 2, and 3. The mold G is preferably removably secured upon the table A, so that it may be detached, if desired. The hollow mold G (shown at Figs. 1, 2, 3, 7, and 8) is suitable when only one size and shape of boot or shoe is required to be lasted on the machine.

The hollow mold G is shown as cast or formed in one piece, with its interior $g$ formed to suit, but slightly larger than, the last H, and it is fixed to the table A, directly over but at a right angle to the bearer C, by any convenient means in such a manner that when an ordinary iron last is inserted in its interior the sole thereof will be uppermost.

The inner or recessed portion $g$ of the mold G is made to conform to the outer contour of the boot or shoe to be lasted, as well as to correspond with though slightly larger than that of the last. The difference in the sizes of the recess $g$ and the last H in this class of molds should only be equal to about the thickness of the upper. In order that the hollow inner portion $g$ may exactly correspond with the contour of the boot or shoe, I have found it convenient in practice to take a plaster-of-paris cast or model of the boot or shoe, (after the last has been inserted,) from which the "core" for the interior of the mold is made.

It will be readily understood that care will have to be taken in the formation of the molds, so as not to get them too large; but by forming them as above described there should be little or no difficulty in making them the correct size; also, in this class of molds a separate one is required for each size of boot or shoe to be lasted. By blocking the uppers into the mold each boot or shoe will be as near as possible a copy of its original or pattern.

In the bearer C is a slot-hole $c$, in which is placed a vertical bush or bearing $c'$, provided with a cup or recess $c^2$ in its upper portion. In the bearing is mounted so as to slide freely the supporting-pin $h$, on which an ordinary iron last H is placed, with its sole uppermost, as shown. The pin $h$ is held up to its work by means of a spiral spring $h'$, one end of which fits into the cup $c^2$, while its opposite end works against a plate or projection $h^2$, fixed on or to the pin $h$.

At Fig. 2 the last H is shown supported on the pin $h$ and pressed down into the mold G (by a hand-wheel and screw arrangement to be hereinafter described,) ready for receiving the closing operation; but when it is desired to remove the last from the mold the pin $h$ is forced upward by a bar $h^3$, attached to a bearing or supporting piece $h^5$ (which acts as a fulcrum) by any ordinary means—such as a pin passing through a slot-hole in the bar. One end of the bar is forked for receiving the pin $h$, so as to get a better purchase thereon for raising purposes. Suitable springs and catches may also be employed for raising and holding the bar $h^5$ in any given position.

Figure 5:
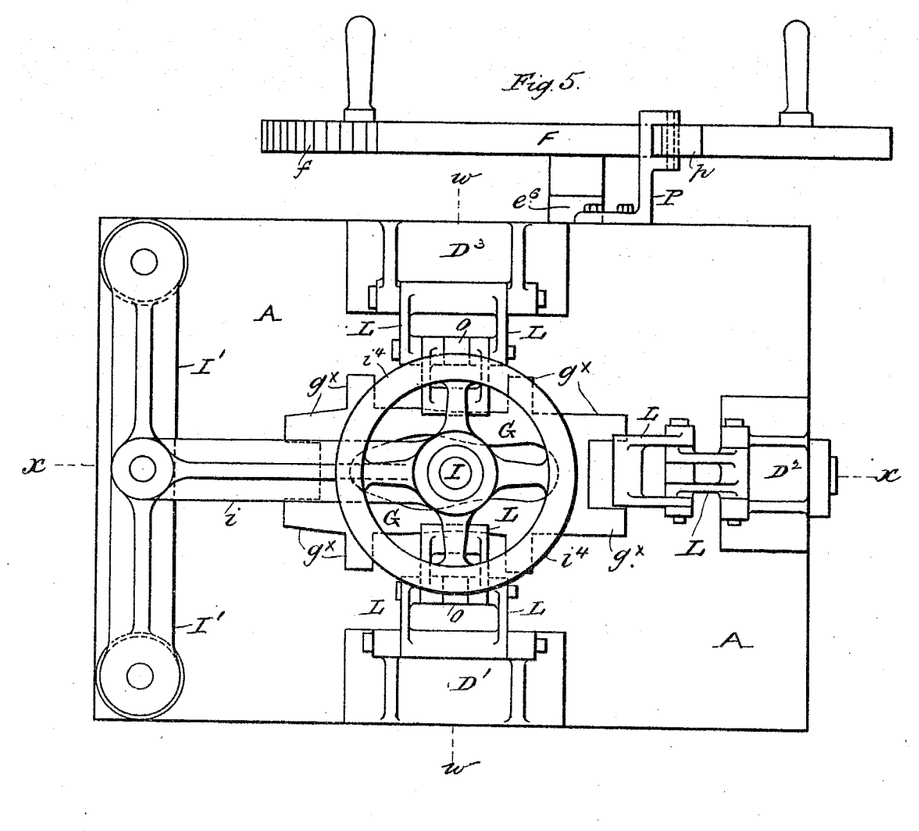
Fig. 5, a part plan looking at the top.
Figure 6:
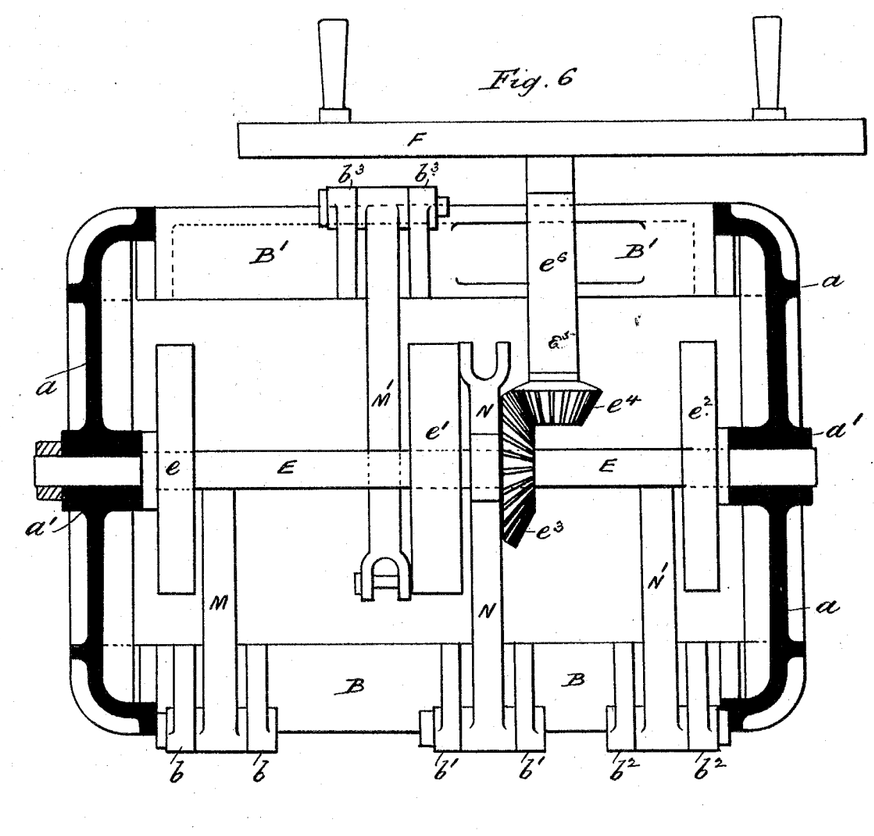
Fig. 6, a part sectional plan on line $yy$, Fig. 4.

I is a screw, which in the drawings at Figs. 2, 3, and 5 is mounted in a bearing $i$ on a movable arm $i'$, which is pivoted to cross-bar I', supported from the table A by the two pillars $I^2$ $I^2$.

The screw I is employed for forcing the last H down into the mold and thus blocks the upper to shape prior to its edges being closed over the insole. The screw I and bridge $i^2$ are kept in position by means of a slotted guide $i^5$ and set-screw $i^6$, fixed to bearing $i$. On the lower end of the screw I is pivoted a bridge $i^2$, to one end of which may be attached a flat thin metal plate $i^3$ for obtaining a greater longitudinal bearing on the inner sole and last. To the upper end of the screw I is fixed a hand-wheel $i^4$ for raising and lowering the screw. The arm $i$ and screw I may, when in operation, if desired, be retained in position by a suitable catch or spring pin device. When it is required to remove the last from the mold after the lasting operation has been performed, the screw is raised and the arm moved on its pivot clear of the mold.

To each side and end of the mold G may be cast or attached thereto a flange or any number of pieces $g^\times$ (preferably two on each side and end) projecting outward in a horizontal direction. On these projections $g^\times$ slide the closing or wiper plates J J' J² J³. In the drawings at Fig. 8 these plates are shown retained in position by means of studs and nuts $j\ j'\ j^2\ j^3$, passing through slot-holes $j^4\ j^5\ j^6\ j^7$. The plates are also provided with brackets $j^8$, for supporting the pin or rod $j^9$, to which one end of each toggle L is attached.

Figure 7:
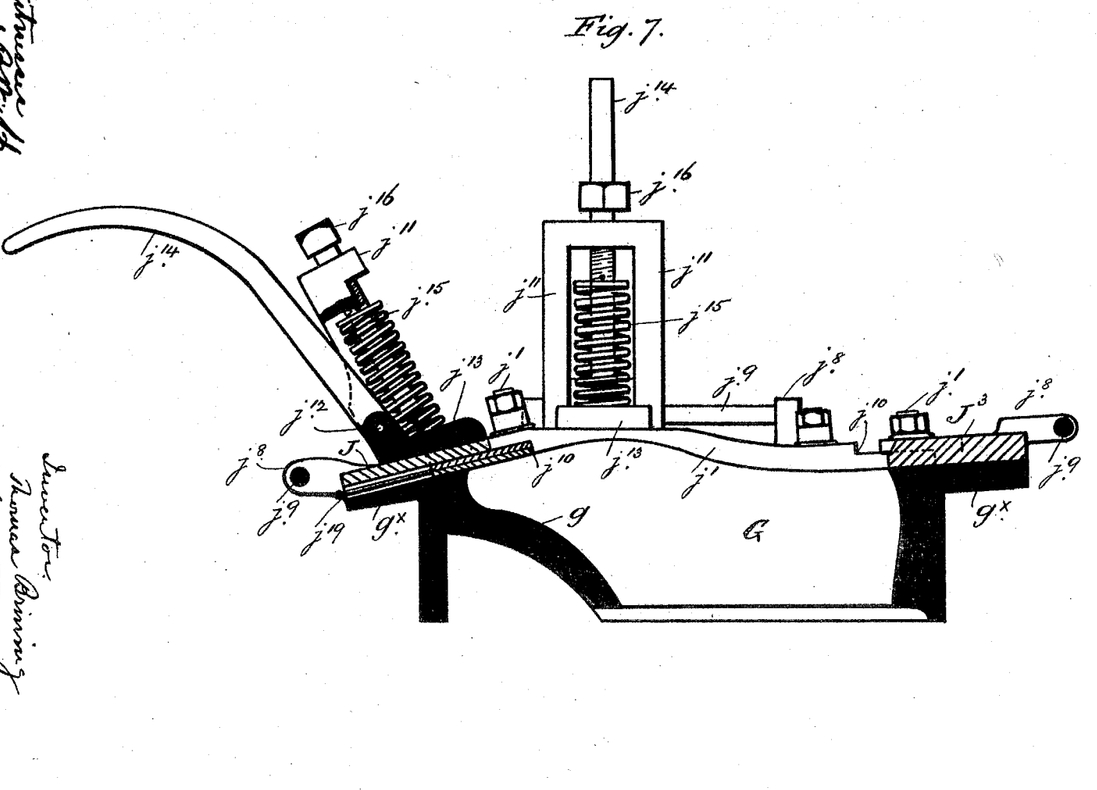
Figs. 7 and 8 are respectively a longitudinal section and plan of hollow mold and upper closing devices and grippers.
Figures 8, 14:
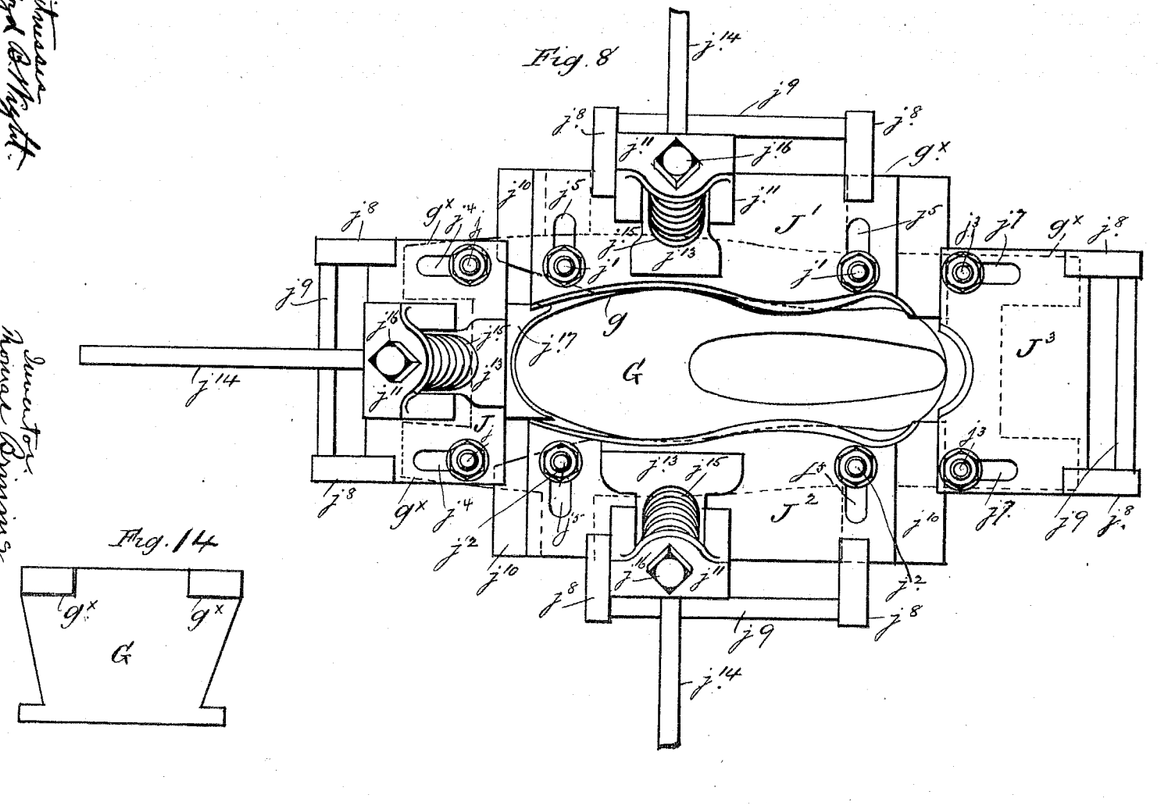

On reference to Figs. 5 and 8 it will be seen that the side plates J' J² are preferably shaped to suit the contour of the sides and length of the mold as well as of the boot or shoe, while the toe and heel plates J J³ are respectively shaped to correspond with the contour (or a portion thereof) of the toe and heel. The inner edges of the closing or wiper plates may, if preferred, be serrated or perforated for the insertion of the retaining tacks, tingles, or rivets; but in practice I have found satisfactory results may be obtained when the serrations or perforations are dispensed with. Each plate, in addition to being beveled on its inner edge, is scarfed or recessed at each end—that is, about half the thickness is cut away, as shown at $j^{10}$, so as to permit of each plate sliding up to its work simultaneously with or independently of each other, as well as forming a locking device when the sides of the toe and heel plates come in contact with the projecting portions of the scarfed ends of the side plates J' J², thus preventing the plates from being traversed too far onto the last. The closing or wiper plates J J' J² are each armed (so as to travel with its respective plate) with the gripping device shown at Figs. 7 and 8, which consists of an inverted-⊔-shaped frame or bracket $j^{11}$, fixed by its two ends to the closing-plate. To the bracket $j^{11}$ is pivoted at $j^{12}$ the gripper or retaining plate $j^{13}$, (provided with the curved arm or lever $j^{14}$,) which forms the upper jaw of the gripper, while the upper surface of each plate J J' J², respectively, forms the lower jaw. In order to keep the upper jaw $j^{13}$ down to its work, a strong spiral spring $j^{15}$ (the tension of which is adjusted by set-screw $j^{16}$) is mounted between the two upright sides of each bracket $j^{11}$.

Figure 9:
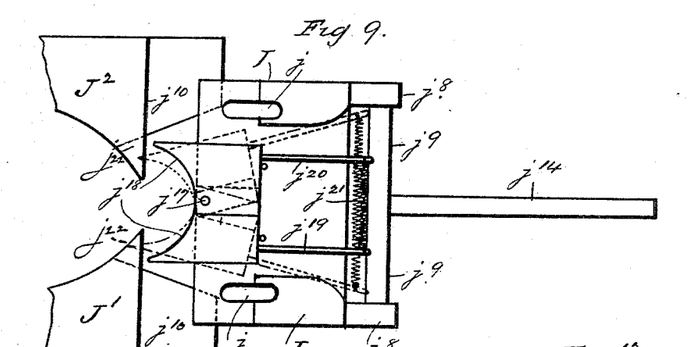
Figs. 9, 10, 11, 12, and 13 are respectively an enlarged plan looking at the under side, a plan looking at the top, a side elevation, a back elevation, and a part back elevation of mechanism for gathering in the toe.
Figures 10, 11, 12, 13:
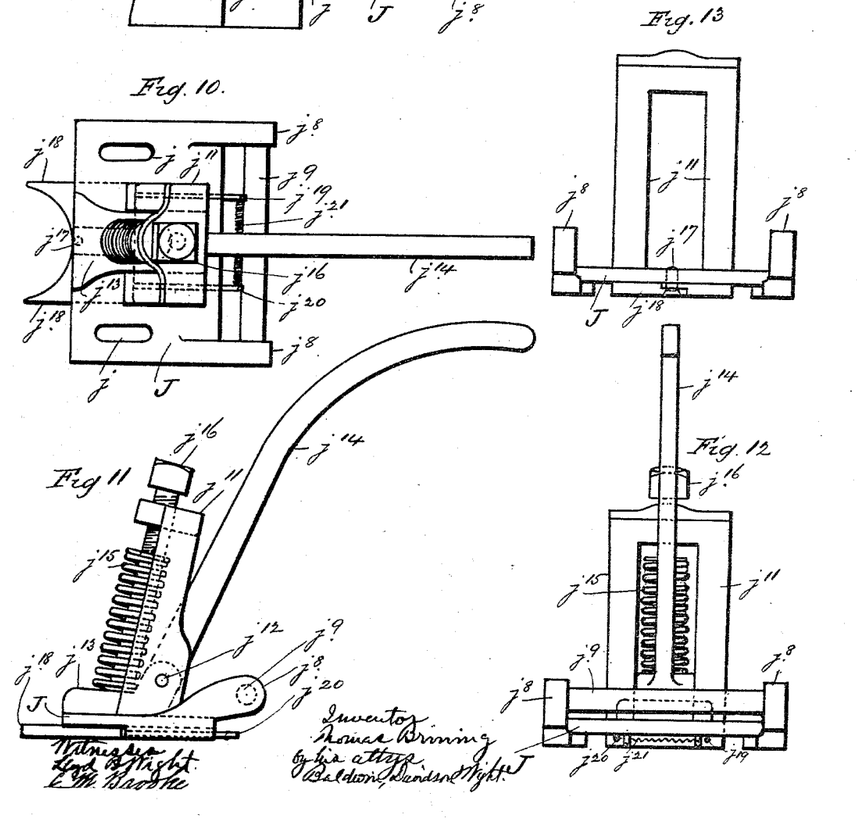

In order to gather in the toe of the boot or shoe, to the under side of the plate J is pivoted at $j^{17}$ the hinged thin-metal jaws $j^{18}$. These jaws are hinged near to the forward recessed or concaved portion thereof, and the pin $j^{17}$ acts as the axis of the hinge as well as the means for attaching them to the plate J'. (See Fig. 9.) To the heel or straight back of each portion of the jaw are attached, respectively, the pins $j^{19}$ and $j^{20}$, between which is placed a spiral spring $j^{21}$ for keeping the rear of the jaws together.

In the operation of lasting the side plates J' J² are closed slightly in advance of the toe and heel plates, and the projecting portions of the scarfed ends of plates J' J² nearest to the toe-plate J are cut, so as to form inclines $j^{22}$, against which the front ends of the jaws $j^{18}$ are made to work, and as the toe-plate is pressed or forced inward against the inclines the jaws are made to gather the toe portion of the upper over the insole and last.

The closing or wiper plates are so arranged that their under surfaces will hold the edges of the upper tightly in position on the insole and last after the former has been closed over the latter and released from the grippers for being tacked down by any convenient means.

The required motion for closing the upper over the insole is obtained from hand-wheel F and conveyed to the closing or wiper plates through shaft $e^5$ to bevel-pinion $e^4$, bevel-wheel $e^3$, shaft E, cams cut or formed, respectively, in plates $e \, e' \, e^2$, levers M M' N N', (pivoted, respectively, to the projecting brackets $b \, b' \, b^2 \, b^3$ on longitudinal stretchers B B'—that is to say, levers M N N' are respectively pivoted to stretchers B at $b \, b' \, b^2$, while lever M' is pivoted at $b^3$ to stretcher B',) connecting-rods and links O, toggle L, and pins or bars $j^9$ at Figs. 7 and 8. It will be readily understood that the levers M M' N N' are operated separately by their respective recessed cams by means of a runner attached to the levers and working therein, and, further, that in the plate $e'$ a cam is cut or formed in each side of the plate.

The toggles L may be formed by bolting four plates $l \, l' \, l^2 \, l^3$ at their ends, respectively, to the brackets D D' D² D³, adjustable and slotted end of connecting-rods O, and rods $j^9$ or slides $j^\times \, j^{23} \, j^{26} \, j^{39}$—that is to say, one end of the plates $l \, l'$ is attached or coupled to the brackets, while the opposite ends and one end of the plates $l^2 \, l^3$ are coupled to the connecting-rods O, and the free ends of the latter plates are notched or catch-shaped for hooking onto the rods or slides.

In order to keep the closing or wiper plates up to their work during the tacking down of the upper after it has been closed over the insole, to the table A is fixed a bracket P, carrying a pivoted pawl $p$, which engages with the ratchet-teeth $f$ in the hand-wheel F, and thus holds the closing or wiper plates in position; but when it is desired to release them from their work the pawl is thrown out of gear and the hand-wheel rotated until the set-screw $f'$ comes in contact with the bracket P, which, acting as a stop, prevents the wheel from rotating too much.

To last the upper of a boot or shoe to its insole I proceed as follows: After notching or serrating the toe and heel of the upper to prevent "piping" or puckering and fastening the openings between the leg-quarters, it is placed in the hollow mold with the top downward. The edges of the toe and side portions of the upper are then made fast in the jaws of the grippers. Then an iron last with an insole thereon is inserted and pressed down by hand-wheel $i^5$, screw I, and bridge $i^2$ until the upper has been blocked to the shape of the inner contour of the mold and to that of the outside of the last. The last is held in this position by the screw until the upper has been closed over by the wipers and tacked to the insole. The motion for closing the wiper-plates is imparted by hand-wheel F, as hereinbefore described, which causes the side plates or wipers to close over the sides of the upper slightly in advance of the toe and heel plates or wipers. By the time that the upper has been drawn firmly over the last and insole the plates are so arranged that they become locked, as described, and are retained in that position by pawl $p$ engaging with the ratchet-teeth $f$ in the hand-wheel F. The edges of the upper are then released from the jaws of the grippers, (when the tension of the springs $j^{15}$ are not adjusted to allow of the wipers drawing the edges therefrom,) and the upper held in position by the under surfaces of the wipers until the upper has been tacked onto the insole. The pawl is then released from the ratchet-teeth $f$, the wipers returned to their normal position, the screw I released from its hold upon the insole, and the lasted upper and last raised from the mold by bar $h^5$, ready for the next operation.

I am aware that prior to my invention lasting-machines with a cavity for the reception of the upper and last have been described in the specifications of German Empire patents granted to G. W. Copeland, of Boston, No. 676, dated September 9, 1877; Fredrich Holland, of Dresden, No. 40,309, dated October 22, 1886, and Charles B. Lancaster, of Boston, Massachusetts, United States of America, No. 43,773, dated April 19, 1887. I therefore do not claim such a combination, broadly; but What I do claim as my invention, and desire to secure by Letters Patent, is—

1. A machine for lasting boots or shoes, consisting of a hollow mold shaped to conform to the outer contour of the boot or shoe mounted upon frame-work and armed with grippers and wipers for drawing the upper over the last and insole, a screw for forcing the last and upper into the mold, and mechanism, as described, for operating said wipers, all substantially as shown.

2. In a lasting-machine, the combination, substantially as hereinbefore set forth, of a table A, the framing on which it is mounted, a hollow mold having its interior shaped to conform to the contour of a boot or shoe and having a laterally-projecting flange $g^\times$ on both sides and at each end, and wipers adjustably secured on the upper face of the flange at each end and on both sides of the mold.

3. In a lasting-machine, the combination, substantially as hereinbefore set forth, of a hollow mold having its interior shaped to conform to the contour of the boot or shoe to be lasted, the scarfed or recessed wipers on each side of the mold having their inner edges shaped to conform to the contour of the sides and length of the mold and of the boot or shoe to be lasted, wipers at the toe and heel ends of the mold shaped to correspond with the contour of the toe and heel, and grippers for securing the edges of the uppers to be lasted.

4. In a lasting-machine, the combination of a hollow mold shaped to the outer contour of the boot, the wipers J J' J² J³, each of which is actuated on said mold independently of the others, said wipers having grippers $j^{13}$, substantially as described, for holding the upper in position, substantially as described.

5. In a lasting-machine, the combination of a hollow mold mounted on the table of the machine, the toe and heel wipers adapted to slide on said mold, the hinged plates $j^{18}$, pins $j^{19}$ $j^{20}$, and spring adapted to keep the plates open, all substantially as set forth.

6. The combination of a table mounted upon framing, hollow mold-plates J J' J² J³, studs and nuts $j$ $j'$ $j^2$ $j^3$, slot-holes $j^4$ $j^5$ $j^6$ $j^7$, brackets $j^8$, rods $j^9$, toggles L, cams $e$ $e'$ $e^2$, shafts E $e^5$, bevel-wheels $e^3$ $e^4$, bearing $e^6$, hand-wheel F, ratchet-teeth $f$, set-screw $f'$, bracket $j^{11}$, grippers $j^{13}$, and lever $j^{14}$, all substantially as shown.

7. The combination, with hollow mold G and with the wipers sliding thereon, of a shaft E, common to all the slides, actuated by mechanism, as described, cam carried on said shaft, levers pivoted to the framing of the machine and armed with runners operating in said cam, and rods having one end attached to levers and the other end loosely and adjustably connected to toggle L, having one of their ends connected to brackets on the table A and their free ends to the slides, said connections having play or lost motion to permit of them operating simultaneously or successively, all substantially as shown.

8. In a lasting-machine, the combination of a table mounted upon framing, hollow mold mounted on said table and armed with wipers, and grippers actuated by mechanism, substantially as described, with a last H and screw I, mounted in a movable arm $i'$, pivoted to a support fixed to said table, said screw being armed at one end with a hand-wheel and at the opposite end with a bridge armed with a flat spring-plate, all substantially as and for the purposes described.

9. In a lasting-machine, the combination of a table mounted upon framing, a hollow mold armed with grippers and wipers actuated by mechanism, substantially as described, screw I and its support, hand-wheel, bridge, and flat spring-plate, last H, supporting-pin $h$, spring $h'$, bar $h^3$, bearing $c'$, cup $c^2$, supporting-piece $h^5$, and bearer C, provided with slot-hole $c$, all substantially as shown.

In testimony whereof I have hereunto set my hand to this specification, in the presence of the two subscribing witnesses, at Leeds aforesaid, this 3d day of December, A. D. 1888.

THOMAS BRINING.

Witnesses:
W. FAIRBURN HART,
ADAM C. HART.